United States Patent
Hadas et al.

(10) Patent No.: US 11,243,855 B2
(45) Date of Patent: Feb. 8, 2022

(54) AUTOMATED RESTART OF PAUSED VIRTUAL MACHINES DUE TO INPUT/OUTPUT ERRORS

(71) Applicant: Red Hat Israel, Ltd., Ra'anana (IL)

(72) Inventors: Arik Hadas, Ra'anana (IL); Maor Lipchuk, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 154 days.

(21) Appl. No.: 16/045,583

(22) Filed: Jul. 25, 2018

(65) Prior Publication Data
US 2020/0034255 A1 Jan. 30, 2020

(51) Int. Cl.
*G06F 11/00* (2006.01)
*G06F 11/20* (2006.01)
*G06F 9/455* (2018.01)
*G06F 11/14* (2006.01)

(52) U.S. Cl.
CPC ...... *G06F 11/2017* (2013.01); *G06F 9/45558* (2013.01); *G06F 11/1484* (2013.01); *G06F 11/203* (2013.01); *G06F 2009/45562* (2013.01); *G06F 2009/45575* (2013.01); *G06F 2009/45579* (2013.01); *G06F 2201/805* (2013.01); *G06F 2201/815* (2013.01); *G06F 2201/85* (2013.01)

(58) Field of Classification Search
CPC ............ G06F 11/2017; G06F 11/2023; G06F 11/2028; G06F 11/203; G06F 11/1484; G06F 11/2046; G06F 2009/45575; G06F 2009/45579; G06F 2009/4562; G06F 9/45558
See application file for complete search history.

(56) References Cited

U.S. PATENT DOCUMENTS

| 7,213,246 | B1 * | 5/2007 | van Rietschote ... G06F 11/1482 707/999.202 |
| 9,100,293 | B2 * | 8/2015 | Ziskind ............... G06F 11/1484 |
| 9,329,947 | B2 | 5/2016 | Elyashev et al. |
| 9,665,432 | B2 | 5/2017 | Kruse et al. |

(Continued)

OTHER PUBLICATIONS

Shared Internal Storage: An Introduction, 2007, Seanodes SA, pp. 1-15 (Year: 2007).*

(Continued)

*Primary Examiner* — Marc Duncan
(74) *Attorney, Agent, or Firm* — Womble Bond Dickinson (US) LLP

(57) ABSTRACT

An apparatus includes a storage device of a host computing device. The storage device is to store a virtualization manager. The apparatus also includes a processing device of the host computing device and operatively coupled to the storage device. The processing device is to determine that a first instance of a virtual machine on a first host computing device is paused based on an error associated with a connection to a storage device of the first host computing device, determine whether the second host computing device has access to the storage device of the first host computing device, instantiate a second instance of the virtual machine on the second host computing device when the second host computing device is determined to have access to the storage device of the first host computing device, and to stop the first instance of the virtual machine on the first host computing device.

20 Claims, 4 Drawing Sheets

(56) References Cited

U.S. PATENT DOCUMENTS

| | | | |
|---|---|---|---|
| 9,898,320 B2 | 2/2018 | Tarasuk-Levin et al. | |
| 2011/0314470 A1* | 12/2011 | Elyashev | G06F 11/1484 |
| | | | 718/1 |
| 2015/0237132 A1 | 8/2015 | Antony | |
| 2015/0242232 A1 | 8/2015 | Simoncelli et al. | |
| 2019/0026142 A1* | 1/2019 | Kato | G06F 11/3433 |
| 2019/0317790 A1* | 10/2019 | Haas | H04L 43/0811 |
| 2019/0391843 A1* | 12/2019 | Franciosi | G06F 12/1009 |
| 2020/0026625 A1* | 1/2020 | Konka | G06F 11/203 |

OTHER PUBLICATIONS

Dell™ High Availability Solutions Guide for Microsoft® Hyper-V™ R2, Dell Inc., Oct. 2011, 42 pages.
VMware VMFS—High-Performance Cluster File System for Storage Virtualization, VMware Inc., 2007, 2 pages.
Lavi, Y., "Bug 1317450—(oVirt_turn_off_autoresume_of_paused_VMs) [RFE] Have a Policy for Autoresume of VMs Paused due to IO errors (Stay paused, turn off, restart with defined time out time)," Red Hat Bugzilla, Mar. 14, 2016.

* cited by examiner

AUTOMATED RESTART OF PAUSED VIRTUAL MACHINES DUE TO INPUT/OUTPUT ERRORS

TECHNICAL FIELD

Aspects of the present disclosure relate to virtual computing environments, and more particularly, to automated restart of paused virtual machines due to input/output (I/O) errors in virtual computing environments.

BACKGROUND

A virtual machine (VM) may be considered a software-based emulation of computer hardware. For example, the virtual machine may operate based on computer architecture and functions of the computer hardware resources. Thus, the virtual machine may emulate a physical computing environment, but requests for CPU, memory, hard disk, network, and other hardware resources may be managed by a virtualization layer which translates these requests to the underlying physical computing hardware resources.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
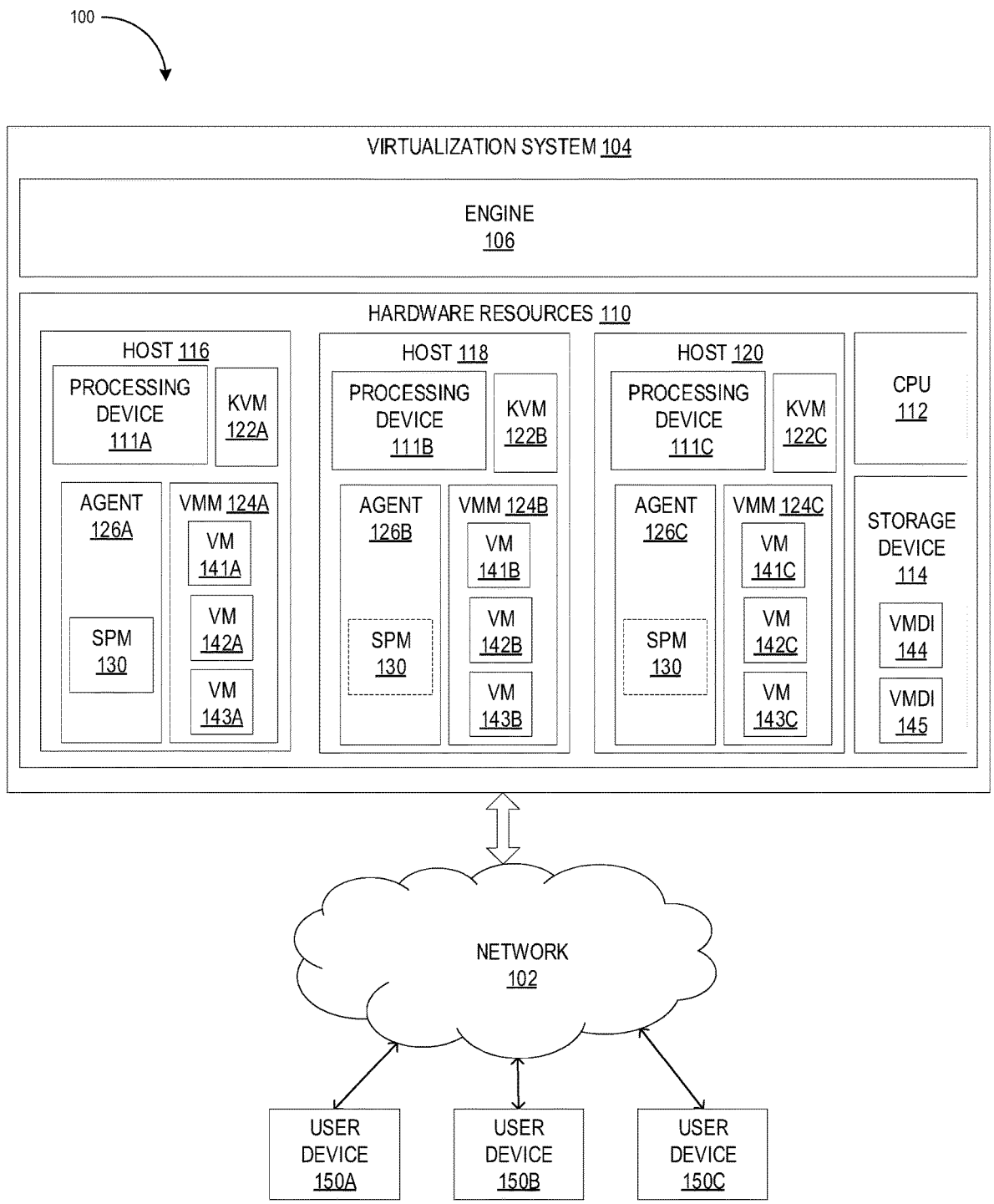
FIG. 1 is a block diagram illustrating a system architecture of a virtual computing environment, in accordance with the present embodiments.

In certain virtual networks (e.g., VLAN), virtual machines (VMs) may get paused due to, for example, input/output (I/O) when the virtual machines lose access to storage. Specifically, in some instances, it may be useful to, for example, automatically configure and test the VMs for network connectivity and/or other requirements prior to runtime. For example, in some embodiments, when logically attaching the VMs to, for example, the virtual networks (e.g., VLAN), agents or other administrators within the network may make a number of assumptions, such as that each of the host computing devices running the VMs include network connectivity to each other. Other assumptions may include, for example in implementing a VLAN embodiment of the virtual networks (e.g., VLAN), that the virtual networks (e.g., VLAN) is properly defined on the external and/or physical network (e.g., including that the correct tags defined on the relevant ports) supporting the host computing devices. The agents or other administrators may further assume that any maximum transmission unit (MTU) requirements include proper connectivity paths, that all application connectivity defined by transmission control protocol (TCP)/user datagram protocol (UDP) includes proper ports, and further that the network 102 is capable of supplying the desired bandwidth rate and connectivity quality. In certain embodiments, if any of the aforementioned assumptions are incorrect, the error may not become apparent until network connectivity untimely fails, such as a runtime of the VMs. It may be thus useful to provide techniques to test the connectivity retirements prior to connecting the VMs to the virtual network (e.g., VLAN), and to periodically check the connectivity state thereafter.

Accordingly, the present embodiments may include techniques to provide automated restart of paused virtual machines on one host computing device due to I/O errors associated with a shared storage device associated with the host computing device. By way of example, a host computing device running, for example, one or more virtualization managers may determine that a first virtual machine instance on a first host computing device has been paused based on the I/O error associated with the connection between the first virtual machine instance and a storage device. Once the virtualization manager determines that the first virtual machine instance on the first host computing device has been paused based on the I/O error, the virtualization manager may then determine whether a second host computing device has access to the storage device of the first host computing device. For example, if the virtualization manager determines that the second host computing device has access to the storage device of the first host computing device, the virtualization manager may then instantiate a second virtual machine instance on the second host computing device.

The virtualization manager may then stop the previously paused first virtual machine instance running on the first host computing device. For example, in one embodiment, the virtualization manager may destroy the previously paused first virtual machine instance running on the first host computing device. On the other hand, if the virtualization manager determines that the second host computing device does not have access to the storage device of the first host computing device, the virtualization manager may maintain the pausing of the first virtual machine instance on first host computing device. In this way, the present techniques may provide automated restart of paused of virtual machines on one host computing device due to, for example, I/O errors by allowing the paused virtual machines to be re-instantiated and resumed on a second host computing device.

With the foregoing in mind, FIG. 1 illustrates an example system architecture 100 in which embodiments of the disclosure may operate. The system architecture 100 may include a virtualization system 104 coupled to and accessible over a network 102 (e.g., VLAN) by a number of user devices 150A-150C. The virtualization system 104 includes a variety of hardware resources 110 which may include, but is not limited to, desktop computers, laptop computers, rackmount servers, routers, switches, tablet computers, mobile phones, or any other type of computing device. The hardware resources 110 may include one or more processing devices, memory, and/or additional devices including, but not limited to, a graphics card, hardware RAID controller, network controller, hard disk drive, universal serial bus (USB) device, internal input/output (I/O) device, keyboard, mouse, speaker, etc. The hardware resources 110 may be used to execute software, including one or more operating systems, virtual machines, or other applications. The virtualization system may also include an engine 106 (which may execute on a portion of the hardware resources 110 or a separate engine device) that manages the hardware resources 110 and the processes running on the hardware resources 110.

The hardware resources 110 include a number of host computing devices 116, 118, and 120 (or host machines or systems) each including a portion of the hardware resources 110. The host computing devices 116, 118, and 120 may each include one or more processing devices and one or more storage devices. The hardware resources 110 may further include one or more additional processing devices 112 and one or more additional storage devices 114.

In some embodiments, each of the host computing devices 116, 118, and 120 may include a kernel space and a user space defined by the hardware resources of the host computing devices 116, 118, and 120. For example, a kernel-based virtual machine (KVM) 122A-122C is executed in the kernel space of the host computing devices 116, 118, and 120. The KVM 122A-122C may allow the host computing devices 116, 118, and 120 to make its hardware resources available to virtual machines 141A-143C which may be executed in the user space. While FIG. 1 illustrates one or more KVM 122A-122C, for example, it should be appreciated that any various virtual machine configurations may be utilized in accordance with the present techniques.

Each of the host computing devices 116, 118, and 120 may execute a virtual machine monitor (VMM) 124A-124C (or a hypervisor). The VMM 124A-124C is an application that executes on a host computing devices 116, 118, and 120 to manage virtual machines 141A-143C. In particular, the VMM 124A-124C may instantiate or start, migrate, pause, or perform another type of event associated with virtual machines 141A-143C. The VMM 124A-124C may include a virtualization API and a multi-platform emulator. Each virtual machine 141A-143C may execute a guest operating system that can be accessed by a user device 150A-150C over the network 102 (e.g., VLAN). Each virtual machine 141A-143C may further run guest applications using the guest operating system.

Each of the host computing devices 116, 118, and 120 may include respective agents 126A, 126B, and 126C. The agents 126A, 126B, and 126C may include, for example, an administrator that may facilitate inter-host communication and perform various monitoring and administrative tasks. The agents 126A, 126B, and 126C may also include functionality for acting as a storage pool manager (SPM) 130. However, in some embodiments, one of the host computing devices 116 may be active as the SPM at any one time. The host computing device 116 may be designated an active SPM 130 by the engine 106. The SPM 130 coordinates metadata changes in the virtualization system 104, such as creating and deleting disk images, creating and merging snapshots, copying images between storage domains, creating templates and storage allocation for block devices of the hardware resources 110 such as hard drives or other storage devices. For example, a storage domain may include a collection of data structures that have a common storage interface, or may contain complete images of templates and virtual machines (including snapshots). The storage domain may also include one or more block devices, one or more storage devices, one or more file systems, one or more volumes, and/or portions thereof.

As shown in FIG. 1, each of the host computing devices 116, 118, and 120 may include processing devices 111A, 111B, and 111C. In some embodiments, the processing devices 111A, 111B, and 111C may execute, for example, general instructions scripts (e.g., which may also be referred to as hooks) that may include operations or commands to be performed on the virtual machines 141A-141C, 142A-142C, and 143A-143C. The processing devices 111A, 111B, and 111C may execute a stored set of specific instructions, for example, in response to an event associated with any of the virtual machines 141A-141C, 142A-142C, and 143A-143C. For example, the virtual machine 141A may be started or initiated on the host computing device 116 and the starting or initiating of the virtual machine 141A may be considered an event. In response to the event, the processing devices 111A of the host computing device 116 may execute the stored set of specific instructions.

Figure 2:
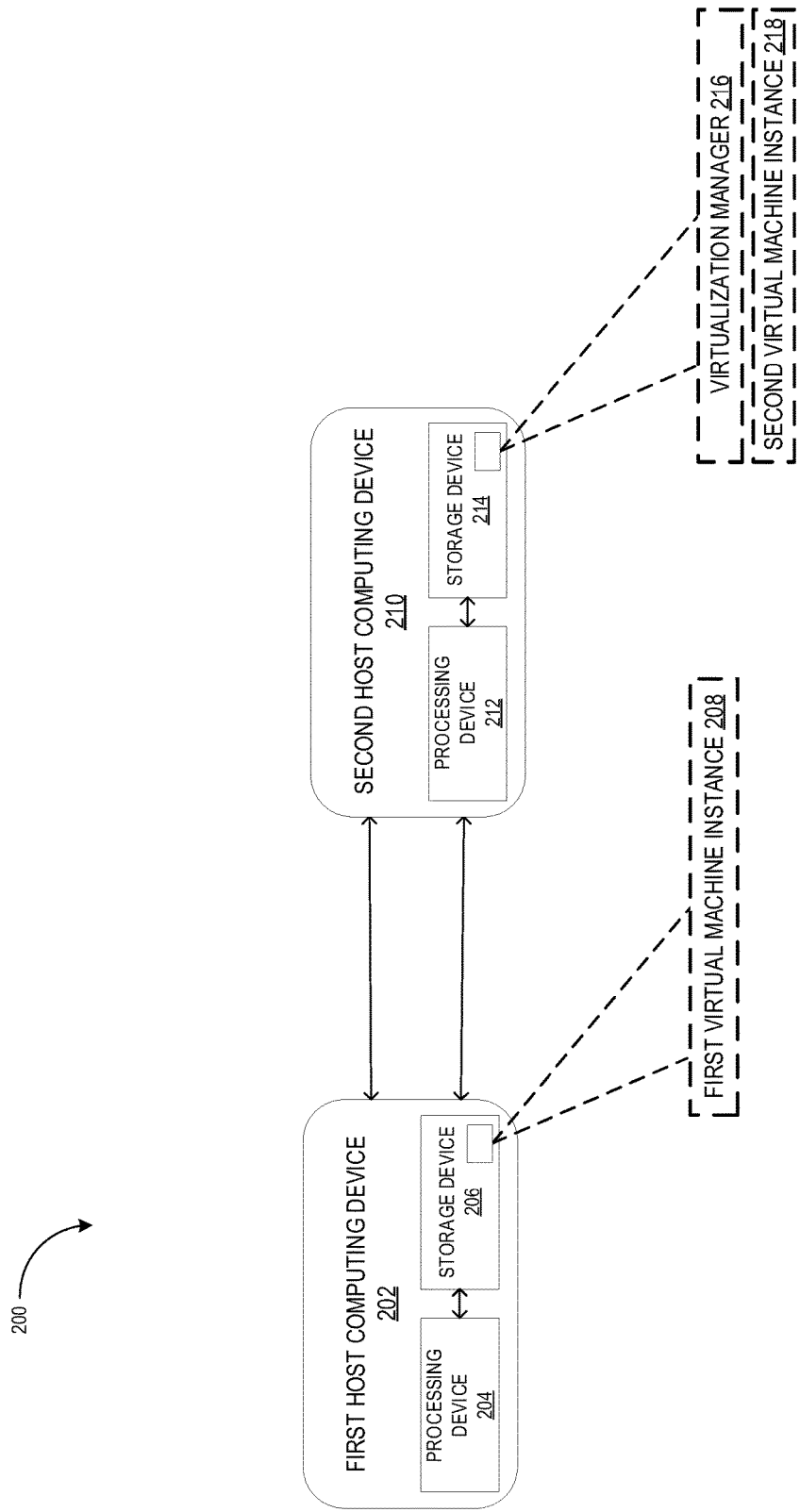
FIG. 2 is another block diagram illustrating an example virtual computing environment, in accordance with the present embodiments.
Figure 3:
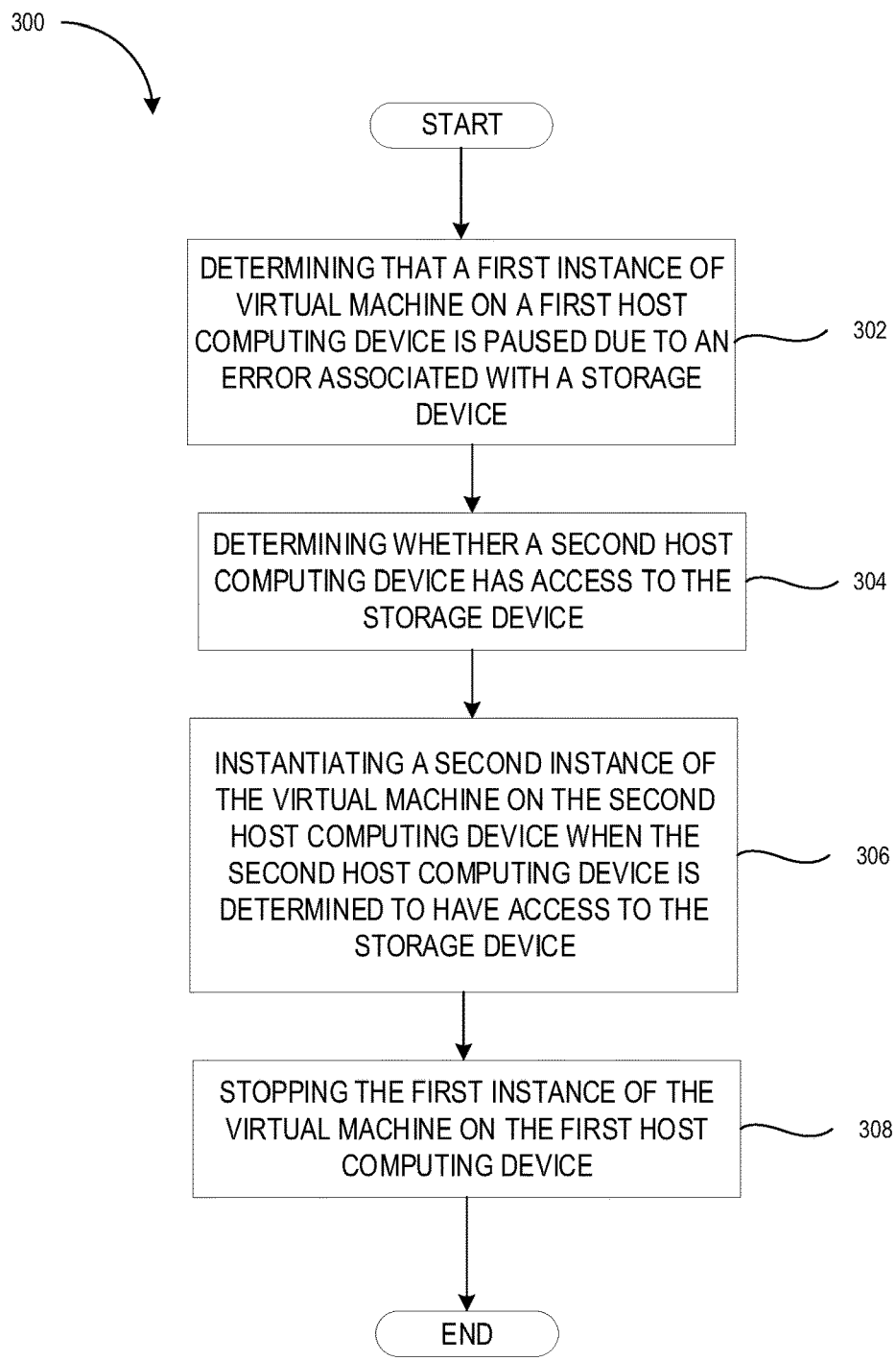
FIG. 3 is a flow diagram of a method of automating restart of virtual machines in virtual computing environments, in accordance with some embodiments of the present disclosure.
Figure 4:
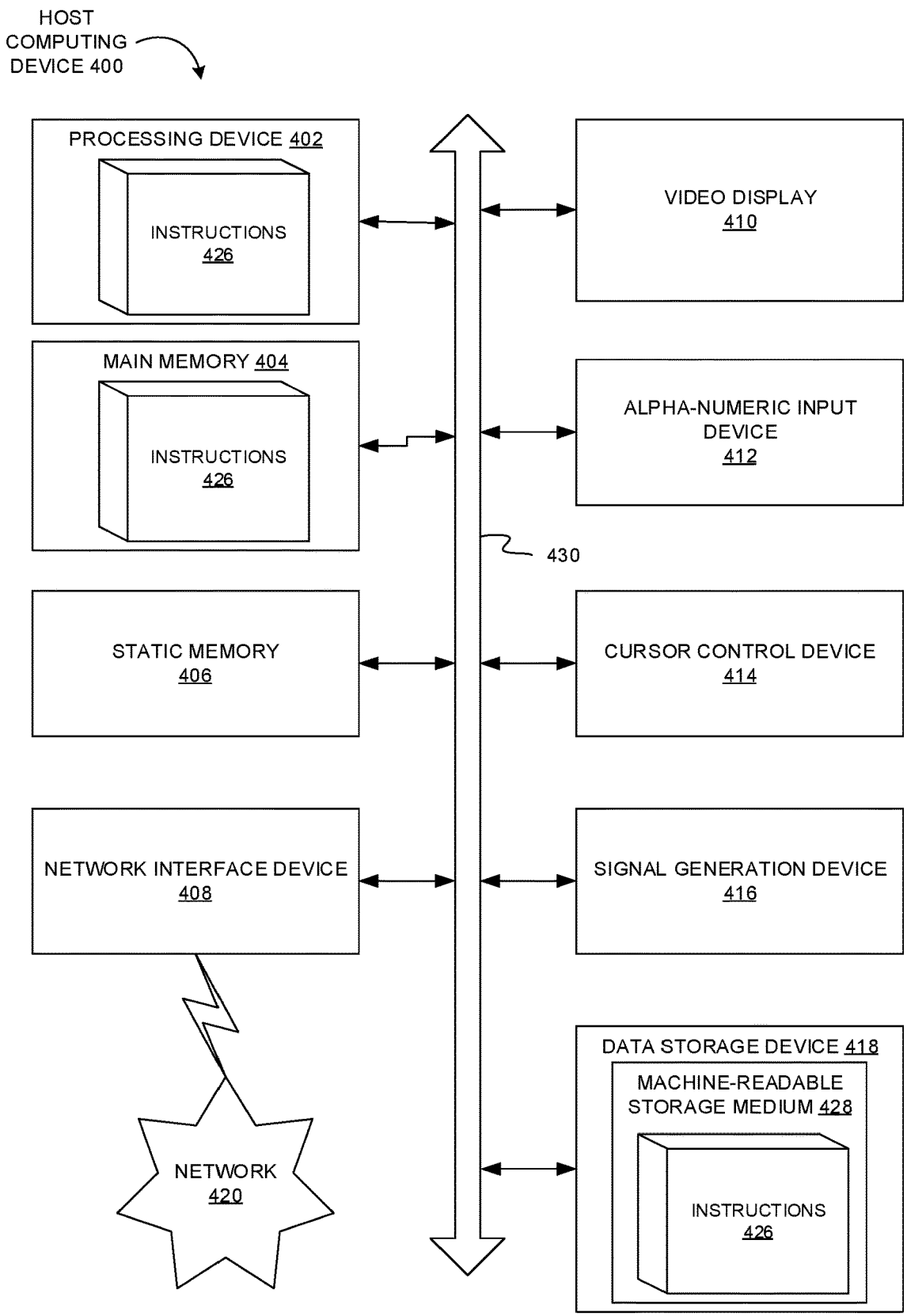
FIG. 4 is a block diagram of an example computing device that may perform one or more of the operations described herein, in accordance with the present embodiments.

In certain embodiments, as will be further appreciated with respect to FIGS. 2-4, it may be useful to, for example, automatically configure and test the VMM 124A, 124B, and 124C for network connectivity and/or other requirements prior to runtime. For example, in some embodiments, when logically attaching the VMMs 124A, 124B, and 124C to, for example, the network 102 (e.g., VLAN), the agents 126A, 126B, and 126C (e.g., administrators) may make a number of assumptions, such as that each of the host computing devices 116, 118, and 120 include network connectivity to each other.

In other embodiments, the assumptions may include, for example in implementing a VLAN embodiment of the network 102, that the network 102 is properly defined on the external and/or physical network (e.g., including that the correct tags defined on the relevant ports) supporting the host computing devices 116, 118, and 120. The agent 126A-126C may further assume that any maximum transmission unit (MTU) requirements include proper connectivity paths, that all application connectivity defined by transmission control protocol (TCP)/user datagram protocol (UDP) includes proper ports, and further that the network 102 is capable of supplying the desired bandwidth rate and connectivity quality. In certain embodiments, if any of the aforementioned assumptions are incorrect, the error may not become apparent until network connectivity untimely fails, such as a runtime of the VMMs 124A, 124B, and 124C. It may be thus useful to provide techniques to test the connectivity retirements prior to connecting the VMMs 124A, 124B, and 124C to the network 102 (e.g., VLAN), and to periodically check the connectivity state thereafter.

FIG. 2 depicts an example virtual computing environment and apparatus 200, which may be utilized to automate the restart of paused virtual machines in accordance with the present embodiments. As depicted, the apparatus 200 may include a first host computing device 202, which may include a processing device 204 and a storage device 206. In certain embodiments, the first host computing device 202 may include a first virtual machine instance 208 stored on the storage device 206 and configured to run on the first host computing device 202. In one embodiment, the first virtual machine instance 208 may be paused when the first host computing device 202 loses, for example, its connection to the storage device 206 (e.g., shared storage device) due to an I/O error.

In certain embodiments, as further depicted, the apparatus 200 may also include a second host computing device 210, which may include a processing device 212 and a storage device 214 (e.g., shared storage device). In certain embodiments, the second host computing device 210 may include a virtualization manager 216 and a second virtual machine instance 218 stored on the storage device 214 and configured to run on the second host computing device 210. In some embodiments, the virtualization manager 216 may be utilized to monitor the connections between the first host computing device 210 and the storage device 206 and/or the second host computing device 210 and the storage device 214. As previously noted, the storage device 206 and the storage device 214 may be part of a shared storage between the first host computing device 202 and the second host computing device 210.

In certain embodiments, during operation, the virtualization manager 216 may determine that the first virtual machine instance 208 on the first host computing device 202 has been paused based on the I/O error associated with the connection between the first virtual machine instance 208 and the storage device 206. Once the virtualization manager 216 determines that the first virtual machine instance 208 on the first host computing device 202 has been paused based on the I/O error, the virtualization manager 216 may then determine whether the second host computing device 210 has access to the storage device 206 of the first host computing device 202.

For example, if the virtualization manager 216 determines that the second host computing device 210 has access to the storage device 206 of the first host computing device 202, the virtualization manager 216 may then instantiate a second virtual machine instance 218 on the second host computing device 210. Specifically, it should be noted that while the second virtual machine instance 218 may include a virtual machine instance different from the first virtual machine instance 208, the second virtual machine instance 218 may utilize, for example, the storage disk(s) of the paused the first virtual machine instance 208. The virtualization manager 216 may then stop the previously paused first virtual machine instance 208 running on the first host computing device 202. For example, in one embodiment, the virtualization manager 216 may destroy the previously paused first virtual machine instance 208 running on the first host computing device 202.

On the other hand, if the virtualization manager 216 determines that the second host computing device 210 does not have access to the storage device 206 of the first host computing device 202, the virtualization manager 216 may maintain the pausing of the first virtual machine instance 208 on first host computing device 202. For example, in one embodiment, the virtualization manager 216 may maintain the pausing of the first virtual machine instance 208 on the first host computing device 202 until the connection between the first host computing device 202 and the storage device 206 (e.g., shared storage device) is restored. In another embodiment, the virtualization manager 216 may maintain the pausing of the first virtual machine instance 208 on the first host computing device 202 until the second host computing device 210 has access to the storage device 206 (e.g., shared storage device) associated with the first host computing device 202. In this way, the present techniques may provide automated restart of paused of virtual machines on one host computing device due to, for example, I/O errors by allowing the paused virtual machines to be re-instantiated and resumed on a second host computing device.

Turning now to FIG. 3, which illustrates is a flow diagram of a method 300 of automating the restart of paused virtual machines in accordance with the present embodiments. The method 300 may also be performed by processing logic (e.g., processing device 204 of the host computing device 202) that may include hardware (e.g., circuitry, dedicated logic, programmable logic, one or more processors, one or more processing devices, a central processing unit (CPU), a system-on-chip (SoC), etc.), software (e.g., instructions running/executing on a processing device), firmware (e.g., microcode), or various combinations thereof.

The method 300 may begin at block 302 with a processing device (e.g., processing device 204) determining that a first instance of a virtual machine on a first host computing device is paused based on an error associated with a connection to a storage device of the first host computing device. The method 300 may continue at block 304 with the processing device (e.g., processing device 212) determining whether a second host computing device has access to the storage device of the first host computing device. The method 300 may then continue at block 306 with the processing device (e.g., processing device 212) instantiating a second instance of the virtual machine on the second host computing device when the second host computing device is determined to have access to the storage device of the first host computing device. The method 300 may then conclude at block 308 with the processing device (e.g., processing device 204) stopping the first instance of the virtual machine on the first host computing device.

FIG. 4 is a block diagram of an example host computing device 400 that may be utilized to automate the restart of paused virtual machines, in accordance with some embodiments. The host computing device 400 may be connected to other computing devices in a LAN, an intranet, an extranet, and/or the Internet. The host computing device 400 may operate in the capacity of a server machine in client-server network environment or in the capacity of a client in a peer-to-peer network environment. The host computing device 400 may be provided by a personal computer (PC), a set-top box (STB), a server, a network router, switch or bridge, or any machine capable of executing a set of instructions (sequential or otherwise) that specify actions to be taken by that machine. Further, while only a single host computing device 400 is illustrated, the term "computing device" shall also be taken to include any collection of computing devices that individually or jointly execute a set (or multiple sets) of instructions to perform the methods discussed herein.

The example host computing device 400 may include a processing device (e.g., a general purpose processor, a PLD, etc.) 402, a main memory 404 (e.g., synchronous dynamic random access memory (DRAM), read-only memory (ROM)), a static memory 406 (e.g., flash memory and a data storage device 418), which may communicate with each other via a bus 430.

Processing device 402 may be provided by one or more general-purpose processing devices such as a microprocessor, central processing unit, or the like. In an illustrative example, processing device 402 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also comprise one or more special-purpose processing devices such as an application specific integrated circuit (ASIC), a field programmable gate array (FPGA), a digital signal processor (DSP), network processor, or the like. The processing device 402 may be configured to execute the operations described herein, in accordance with one or more aspects of the present disclosure, for performing the operations and steps discussed herein.

The host computing device 400 may further include a network interface device 408 which may communicate with a network 420. The host computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

The data storage device 418 may include a computer-readable storage medium 428 on which may be stored one or more sets of instructions, e.g., instructions for carrying out techniques to automate the restart of paused virtual machines in accordance with the present embodiments described herein. Instructions implementing module 426 may also reside, completely or at least partially, within main memory 404 and/or within processing device 402 during execution thereof by host computing device 400, main memory 404 and processing device 402 also constituting computer-readable media. The instructions may further be transmitted or received over a network 420 via network interface device 408.

While computer-readable storage medium 428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulate and transform data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc.

Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. An apparatus, comprising:
an internal storage device of a second host computing device, the internal storage device to store at least one virtualization manager; and
a processing device of the second host computing device operatively coupled to the storage device, the processing device to:
test a connectivity between a first instance of a virtual machine on a first host computing device and an internal storage device of the first host computing device prior to connecting the first instance of the virtual machine to a virtual network;
determine that the first instance of the virtual machine on the first host computing device is paused based on an error associated with a connection to the internal storage device of the first host computing device;
determine whether the second host computing device has access to the internal storage device of the first host computing device;
instantiate a second instance of the virtual machine on the second host computing device when the second host computing device is determined to have access to the internal storage device of the first host computing device; and
stop the first instance of the virtual machine on the first host computing device.

2. The apparatus of claim 1, wherein to determine that the first instance of the virtual machine is paused based on the error, the processing device is to determine that the first instance is paused based on an input/output (I/O) error.

3. The apparatus of claim 1, wherein to determine whether the second host computing device has access to the storage device of the first host computing device, the processing device is to maintain the pausing of the first instance of the virtual machine when the second host computing device is determined not to have access to the storage device of the first host computing device.

4. The apparatus of claim 3, wherein to maintain the pausing of the first instance of the virtual machine, the processing device is to maintain the pausing of the first instance of the virtual machine until the connection between the first host computing device and the storage device is restored.

5. The apparatus of claim 3, wherein to maintain the pausing of the first instance of the virtual machine, the processing device is to maintain the pausing of the first instance of the virtual machine until the second host computing device has access to the storage device of the first host computing device.

6. The apparatus of claim 1, wherein the processing device is to cause the first instance of the virtual machine to be migrated to the second host computing device when the second host computing device is determined to have access to the storage device of the first host computing device.

7. The apparatus of claim 1, wherein to stop the first instance of the virtual machine on the first host computing device, the processing device is to destroy the first instance of the virtual machine on the first host computing device.

8. A method, comprising:
testing a connectivity between a first instance of a virtual machine on a first host computing device and an internal storage device of the first host computing device prior to connecting the first instance of the virtual machine to a virtual network;
determining that the first instance of the virtual machine on the first host computing device is paused based on an error associated with a connection to the internal storage device of the first host computing device;
determining whether a second host computing device has access to the internal storage device of the first host computing device;
instantiating a second instance of the virtual machine on the second host computing device when the second host computing device is determined to have access to the internal storage device of the first host computing device; and
stopping the first instance of the virtual machine on the first host computing device.

9. The method of claim 8, wherein determining that the first instance of the virtual machine is paused based on the error comprises determining that the first instance is paused based on an input/output (I/O) error.

10. The method of claim 8, wherein determining whether the second host computing device has access to the storage device of the first host computing device comprises maintaining the pausing of the first instance of the virtual machine when the second host computing device is determined not to have access to the storage device of the first host computing device.

11. The method of claim 10, wherein maintaining the pausing of the first instance of the virtual machine comprises maintain the pausing of the first instance of the virtual machine until the connection between the first host computing device and the storage device is restored.

12. The method of claim 10, wherein maintaining the pausing of the first instance of the virtual machine comprises maintaining the pausing of the first instance of the virtual machine until the second host computing device has access to the storage device of the first host computing device.

13. The method of claim 8, comprising causing the first instance of the virtual machine to be migrated to the second host computing device when the second host computing device is determined to have access to the storage device of the first host computing device.

14. The method of claim 8, wherein stopping the first instance of the virtual machine on the first host computing device comprises destroying the first instance of the virtual machine on the first host computing device.

15. A non-transitory computer-readable storage medium including instructions that, when executed by a processing device, cause the processing device to:
test a connectivity between a first instance of a virtual machine on a first host computing device and an internal storage device of the first host computing device prior to connecting the first instance of the virtual machine to a virtual network;
determine that the first instance of the virtual machine on the first host computing device is paused based on an error associated with a connection to the internal storage device of the first host computing device;

determine whether a second host computing device has access to the internal storage device of the first host computing device;

instantiate a second instance of the virtual machine on the second host computing device when the second host computing device is determined to have access to the internal storage device of the first host computing device; and stop the first instance of the virtual machine on the first host computing device.

16. The non-transitory computer-readable storage medium of claim 15, to determine that the first instance of the virtual machine is paused based on the error, the processing device is to determine that the first instance is paused based on an input/output (I/O) error.

17. The non-transitory computer-readable storage medium of claim 15, to determine whether the second host computing device has access to the storage device of the first host computing device, the processing device is to maintain the pausing of the first instance of the virtual machine when the second host computing device is determined not to have access to the storage device of the first host computing device.

18. The non-transitory computer-readable storage medium of claim 17, wherein to maintain the pausing of the first instance of the virtual machine, the processing device is to maintain the pausing of the first instance of the virtual machine until the second host computing device has access to the storage device of the first host computing device.

19. The non-transitory computer-readable storage medium of claim 15, wherein the processing device is to cause the first instance of the virtual machine to be migrated to the second host computing device when the second host computing device is determined to have access to the storage device of the first host computing device.

20. The non-transitory computer-readable storage medium of claim 15, to stop the first instance of the virtual machine on the first host computing device, the processing device is to destroy the first instance of the virtual machine on the first host computing device.

* * * * *